(12) United States Patent
Yamashita et al.

(10) Patent No.: US 10,343,477 B2
(45) Date of Patent: Jul. 9, 2019

(54) SHOCK ABSORBER-EQUIPPED VEHICLE

(71) Applicant: HITACHI AUTOMOTIVE SYSTEMS, LTD., Ibaraki (JP)

(72) Inventors: Mikio Yamashita, Zama (JP); Fumiyuki Yamaoka, Sagamihara (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/804,688

(22) Filed: Jul. 21, 2015

(65) Prior Publication Data

US 2016/0031284 A1 Feb. 4, 2016

(30) Foreign Application Priority Data

Jul. 31, 2014 (JP) .................. 156843/2014

(51) Int. Cl.
*B60G 17/015* (2006.01)
*B60G 15/04* (2006.01)
(Continued)

(52) U.S. Cl.
CPC ........... *B60G 17/015* (2013.01); *B60G 15/04* (2013.01); *B60G 17/018* (2013.01); *B60G 17/0162* (2013.01); *B60G 17/0165* (2013.01); *B60G 17/08* (2013.01); *F16F 9/10* (2013.01); *F16F 9/342* (2013.01); *F16F 9/465* (2013.01);
(Continued)

(58) Field of Classification Search
CPC .............. B60G 17/015; B60G 17/0162; B60G 17/018; B60G 17/0165; B60G 15/04; B60G 17/08; B60G 2800/24; B60G 2500/104; B60G 2600/21; B60G 2800/012; B60G 2206/41; B60G 2800/014; F16F 9/10; F16F 9/48; F16F 9/50; F16F 9/486; F16F 9/516
See application file for complete search history.

(56) References Cited

U.S. PATENT DOCUMENTS 4,813,705 A * 3/1989 Hagen ................ B60G 17/0165
280/5.517
4,886,291 A * 12/1989 Okamoto ........... B60G 17/0185
280/5.501
(Continued)

FOREIGN PATENT DOCUMENTS

| JP | 2009-281584 | 12/2009 |
| JP | 2013-241075 | 12/2013 |
| WO | 2013/081004 | 6/2013 |

OTHER PUBLICATIONS

Russian Office Action dated Feb. 19, 2019 in corresponding Russian Patent Application No. 2015131631/11 with English translation.

*Primary Examiner* — Drew J Brown
*Assistant Examiner* — Timothy Wilhelm
(74) *Attorney, Agent, or Firm* — Wenderoth, Lind & Ponack, L.L.P.

(57) ABSTRACT

A suspension system, which is used together with a vehicle including a vehicle body, a front wheel, and a rear wheel, includes a mechanical damping force variable shock absorber disposed between the vehicle body and the front wheel and configured to mechanically change a damping force, and a damping force adjustable shock absorber disposed between the vehicle body and the rear wheel and configured to adjust a damping force by an actuator.

12 Claims, 6 Drawing Sheets

(51) Int. Cl.
*B60G 17/08* (2006.01)
*F16F 9/10* (2006.01)
*F16F 9/50* (2006.01)
*B60G 17/016* (2006.01)
*B60G 17/0165* (2006.01)
*B60G 17/018* (2006.01)
*F16F 9/342* (2006.01)
*F16F 9/46* (2006.01)

(52) U.S. Cl.
CPC ............ *F16F 9/50* (2013.01); *B60G 2206/41* (2013.01); *B60G 2500/104* (2013.01); *B60G 2600/21* (2013.01); *B60G 2800/012* (2013.01); *B60G 2800/014* (2013.01); *B60G 2800/24* (2013.01)

(56) References Cited

U.S. PATENT DOCUMENTS

| | | | | |
|---|---|---|---|---|
| 5,316,114 | A * | 5/1994 | Furuya | B60G 17/08 137/625.3 |
| 5,368,142 | A * | 11/1994 | Ashiba | F16F 9/468 188/266.3 |
| 5,404,973 | A * | 4/1995 | Katoh | F16F 9/468 188/266.3 |
| 5,497,862 | A * | 3/1996 | Hoya | B60G 17/0152 188/266.4 |
| 5,510,985 | A * | 4/1996 | Yamaoka | B60G 17/0165 280/124.145 |
| 5,810,384 | A * | 9/1998 | Iwasaki | B60G 17/0165 280/5.507 |
| 5,944,153 | A * | 8/1999 | Ichimaru | B60G 17/015 188/299.1 |
| 6,067,491 | A * | 5/2000 | Takahashi | B60G 17/016 180/89.12 |
| 6,295,493 | B1 | 9/2001 | Kawazoe | |
| 6,296,092 | B1 * | 10/2001 | Marking | F16F 9/0209 188/315 |
| 6,321,887 | B1 * | 11/2001 | Kurusu | B60G 17/018 188/266.2 |
| 6,371,262 | B1 * | 4/2002 | Katou | F16F 9/465 188/266.5 |
| 6,860,370 | B2 * | 3/2005 | Nakadate | F16F 9/3485 188/282.5 |
| 7,333,882 | B2 * | 2/2008 | Uchino | B60G 17/016 267/136 |
| 8,069,964 | B2 * | 12/2011 | Deferme | F16F 9/3481 188/322.15 |
| 8,296,010 | B2 * | 10/2012 | Hirao | B60G 17/06 280/5.507 |
| 8,348,283 | B2 * | 1/2013 | Harada | B60T 8/1755 280/5.5 |
| 8,607,943 | B2 * | 12/2013 | Donahue | F16F 9/516 188/315 |
| 8,695,766 | B2 * | 4/2014 | Yamashita | F16F 9/49 188/282.5 |
| 8,718,872 | B2 * | 5/2014 | Hirao | B60G 17/08 701/38 |
| 8,800,729 | B2 * | 8/2014 | Yabe | F16F 9/465 188/266.6 |
| 8,838,336 | B2 * | 9/2014 | Hirao | B60G 17/08 303/146 |
| 9,074,651 | B2 * | 7/2015 | Bismans | F16F 9/48 |
| 9,108,484 | B2 * | 8/2015 | Reybrouck | B60G 17/0272 |
| 9,139,065 | B2 * | 9/2015 | Yamashita | F16F 9/342 |
| 9,249,854 | B2 * | 2/2016 | Kim | F16F 9/348 |
| 9,278,599 | B2 * | 3/2016 | Hirao | B60G 17/018 |
| 9,840,123 | B2 * | 12/2017 | Teraoka | B60G 13/08 |
| 2007/0209892 | A1 * | 9/2007 | Masamura | F16F 9/465 188/266 |
| 2008/0115663 | A1 * | 5/2008 | Hammer | F16F 9/48 92/143 |
| 2009/0242339 | A1 | 10/2009 | Nakadate et al. | |
| 2011/0035089 | A1 * | 2/2011 | Hirao | B60G 17/06 701/31.4 |
| 2015/0217621 | A1 * | 8/2015 | Yamashita | B60G 13/08 188/266.2 |
| 2015/0247547 | A1 * | 9/2015 | Yamashita | F16F 9/348 188/313 |
| 2016/0040742 | A1 * | 2/2016 | Yamashita | F16F 9/342 188/284 |

* cited by examiner

SHOCK ABSORBER-EQUIPPED VEHICLE

BACKGROUND OF THE INVENTION

The present invention relates to a shock absorber-equipped vehicle, such as a four-wheeled automobile, including a shock absorber mounted on, for example, each of a front wheel side and a rear wheel side.

Generally, vehicles such as four-wheeled automobiles are provided with a shock absorber on each wheel so as to be able to damp a vibration when the vehicle is running. As this type of shook absorber according to a conventional technique, there is a shock absorber that can mechanically variably adjust a damping force. Known examples thereof include a stroke-sensitive shock absorber configured to change a damping force characteristic according to at stroke position of a piston rod (for example, refer to International Publication No. 2013/081004). Further, there is also known a damping force adjustable shock absorber including an electronically controllable actuator that variably adjusts a generated damping force according to, for example, conditions under which the vehicle is driven that include a state of a road surface (for example, refer to Japanese Patent Application Public Disclosure No. 2009-281584).

[Patent Literature 1] International Publication No. 2013/081004

[Patent Literature 2] Japanese Patent Application Public Disclosure No. 2009-281584

The above-described stroke-sensitive shock absorber according to International Publication No. 2013/081004 is configured to change the damping force characteristic according to, for example, the stoke position of the piston rod, and does not require a sensor and the like for detecting, for example, the conditions under which the vehicle is driven. This omission leads to advantages of eliminating a necessity of the electronically controllable actuator and the like and simplifying the entire configuration, to thereby reduce manufacturing cost and improve workability at the time of assembling. However, the shock absorber configured to mechanically change the damping force, like the stroke-sensitive shock absorber, cannot variably adjust the generated damping force according to the conditions under which the vehicle is driven, a change in the road surface, and the like, and therefore cannot necessarily sufficiently improve ride comfort, maneuvering stability, and the like of the vehicle.

On the other hand, the damping force adjustable shock absorber according to Japanese Patent Application Public Disclosure No. 2009-281584 has a sophisticated function so as to be able to improve the ride comfort and the maneuvering stability of the vehicle. However, in this case, the shock absorber requires the sensor and the like for detecting the conditions under which the vehicle is driven, the change in the road surface, and the like, and uses the expensive electronically controllable actuator and the like, which raises a problem of complicating the entire configuration and making it difficult to improve the workability at the time of the manufacturing and the assembling.

SUMMARY OF THE INVENTION

An object of the present invention is to solve at least one of the above-described problems.

To solve the above-described problem, according an aspect of the present invention, a mechanical damping force variable shock absorber configured, to mechanically change a damping force, and a damping force adjustable shock absorber are combined to each other.

According to an aspect of the present invention, a shock absorber-equipped vehicle includes a vehicle body self-propelled and provided with a front wheel and a rear wheel, a mechanical damping force variable shock, absorber disposed between the vehicle body and the front wheel and configured to mechanically change a damping force, and a damping force adjustable shock absorber disposed between the vehicle body and the rear wheel and configured to adjust a damping force by an actuator.

According to an aspect of the present invention, a suspension system, which is used together with a vehicle including a vehicle body, a front wheel, and a rear wheel, includes a mechanical damping force variable shock absorber disposed between the vehicle body and the front wheel and configured to mechanically change a damping force, and a damping force adjustable shock absorber disposed between the vehicle body and the rear wheel and configured to adjust a clamping force by an actuator.

BRIEF DESCRIPTION OF THE DRAWINGS

FIG. 5 is a control block diagram illustrating a damping force control damper mounted on a rear wheel side illustrated in FIG. 1, together with a controller and the like.

FIG. 5 illustrates characteristic lines each representing a characteristic of a steering angle or a yaw rate when a vehicle is running in comparison between the vehicle according to the present embodiment and comparative examples.

DETAILED DESCRIPTION OF THE PREFERRED EMBODIMENTS

In the following description, a suspension system and a shock absorber-equipped vehicle according to an embodiment of the present invention will be described. The present embodiment will be described in detail with reference to the attached drawings, FIGS. 1 to 8, assuming that the shock absorber-equipped vehicle is embodied by a four-wheeled automobile generally called a compact car by way of example. The suspension system according to the present embodiment includes a stroke-sensitive shock absorber 6 as a mechanical damping force variable shock absorber, and a damping force adjustable shock absorber 9, which will be described below.

Figure 1:
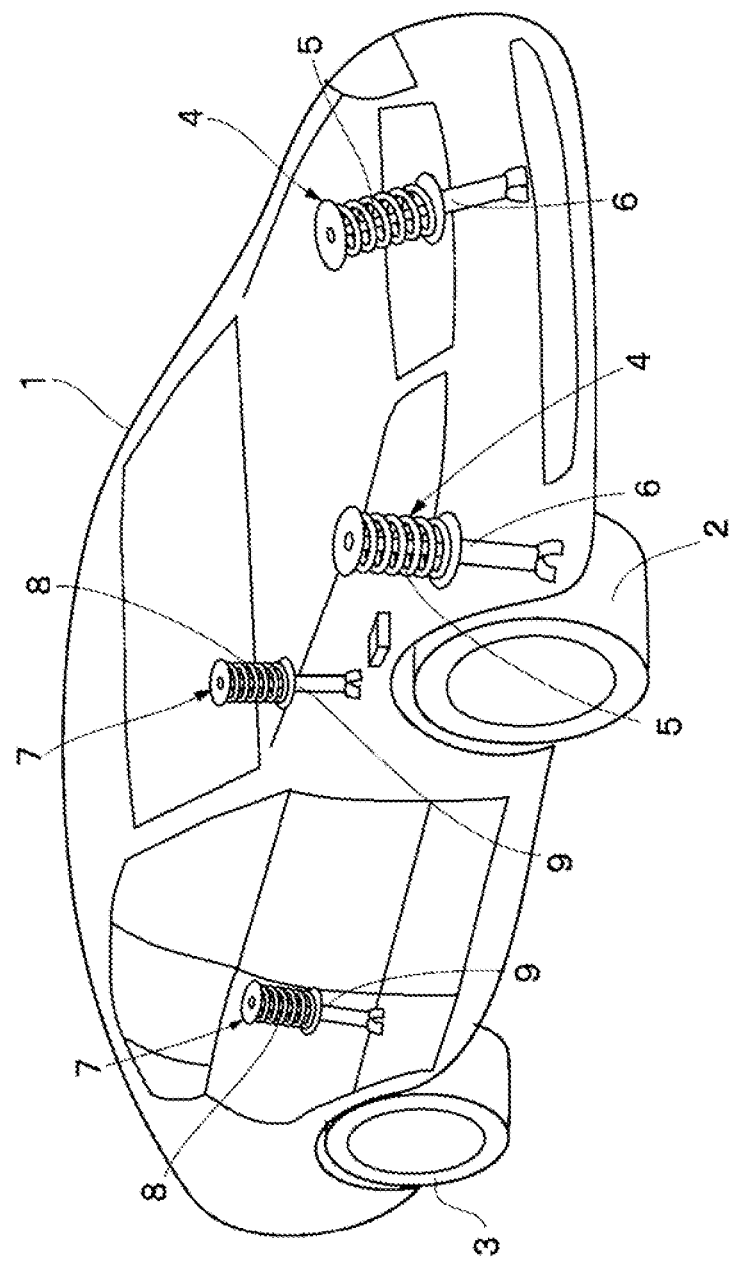
FIG. 1 is a perspective view illustrating a four-wheeled automobile as a shock absorber-equipped vehicle according to an embodiment of the present invention.

Referring to FIG. 1, a motor (not illustrated) such as an engine is mounted on a vehicle body 1 constituting a main structure of the vehicle (the compact car), and, for example, a plurality of seats (not illustrated) including a driver seat is prepared in the vehicle body 1. For example, front left and right wheels 2 (only one of them is illustrated), and rear left and right wheels 3 (only one of them is illustrated) are mounted under the vehicle body 1. In the present embodiment, the vehicle includes the plurality of seats, but may include a single seat. Further, the vehicle is assumed to be the four-wheeled automobile by way of example, but the present invention is also applicable to a vehicle including at least one front wheel and at least one rear wheel.

Front wheel-side suspension apparatuses 4 are mounted between the front left wheel 2 side and the front right wheel 2 side, and the vehicle body 1, respectively. The front wheel-side suspension apparatuses 4 include left and right suspension springs 5 (hereinafter referred to as springs 5), and stroke-sensitive shock absorbers 6 as left and right mechanical damping force variable shock absorbers mounted between the front left and right wheel 2 sides and the vehicle body 1 in parallel with these respective springs 5 (hereinafter referred to as stroke-sensitive dampers 6), respectively.

As will be used herein, the phrase "capable of or configured to mechanically variably adjusting or adjust a damping force" means "capable of or configured to variably adjusting or adjust a damping force without using an actuator". The mechanical damping force variable shock absorber includes, for example, a shock absorber in which the damping force automatically changes according to a stroke position, and a shock absorber in which the damping force automatically changes according to a vibration frequency, and does not include a shock absorber in which the damping force non-automatically changes by an actuator. Further, the mechanical damping force variable shock absorber also does not include a so-called conventional-type shock absorber in which the damping force changes only according to a piston speed.

Figure 2:
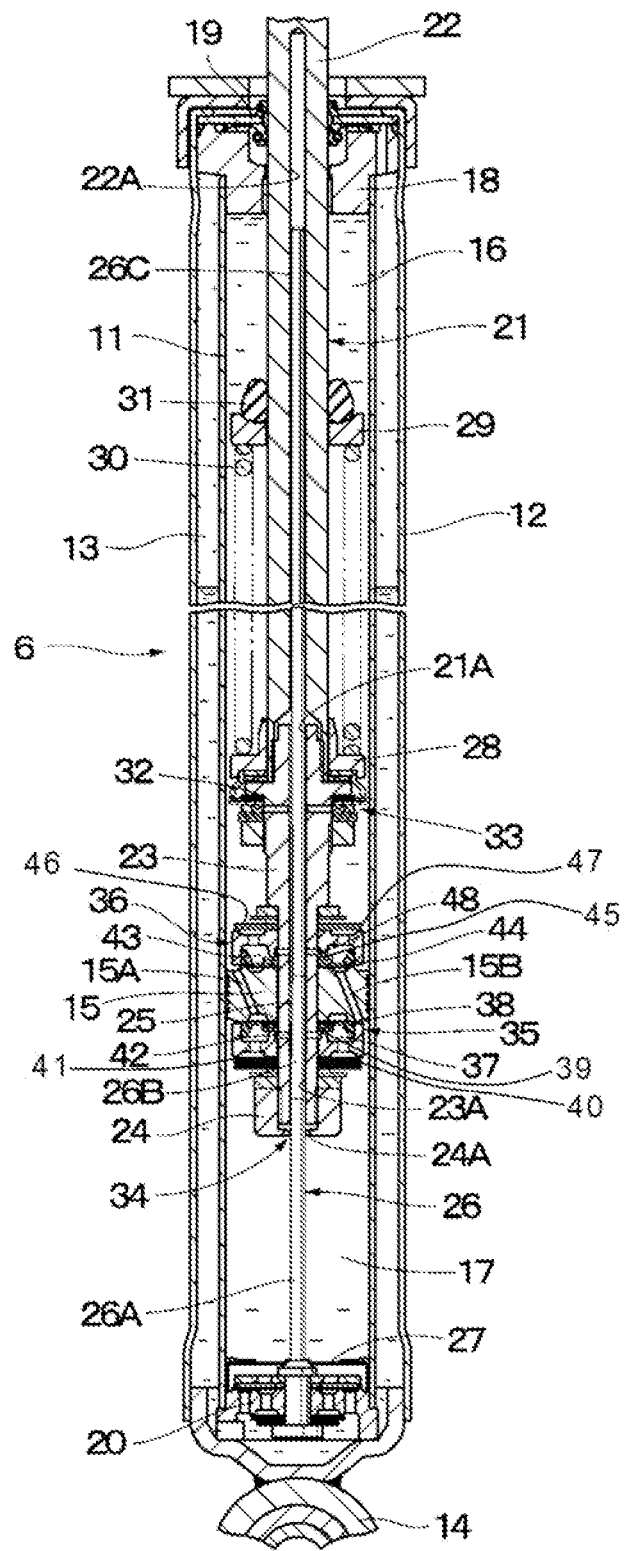
FIG. 2 is an enlarged vertical cross-sectional view illustrating a stroke-sensitive damper mounted on a front wheel side illustrated in FIG. 1.

As illustrated in FIG. 2, the stroke-sensitive dampers 6 each include an inner tube 11, an outer tube 12, a piston 15, a piston rod 21, a metering pin 26, a rebound spring 30, first and second passage area adjustment mechanisms 33 and 34, extension-side and compression-side damping force generation mechanisms 35 and 36, and the like. Due to this configuration, the left and right stroke-sensitive dampers 6 each nave a function of improving a performance of damping a vibration in a return direction while reducing stiffness of the vehicle body 1 in a roll direction on the front left and right wheel 2 side.

Rear wheel-side suspension apparatuses 7 are mounted between the rear left and right wheel 3 sides, and the vehicle body 1, respectively. The rear wheel-side suspension apparatuses 7 include left and right suspension springs 8 (hereinafter referred to as the springs 8), and left and right damping force adjustable shock absorbers 9 mounted between the rear left and right wheel 3 sides and the vehicle body 1 in parallel with these respective springs 8 (hereinafter referred to as damping force control dampers 9), respectively. An electronically controllable actuator 9A including a damping force adjustment valve, a solenoid, and the like (refer to FIG. 5) is attached to each of the damping force control dampers 9 to allow a damping force characteristic thereof to be continuously adjusted from a hard characteristic (a strong damping force) to a soft characteristic (a weak damping force).

The damping force characteristic of the damping force control damper 9 is variably controlled according to a control signal output from, a controller 51, which will be described below, to the actuator 9A. More specifically, the damping force generated by the damping force control damper 9 is variably adjusted by the actuator 9A according to, for example, conditions under which the vehicle is driven that include a state of a road surface. The actuator 9A, which adjusts the damping force, does not necessarily have to be configured to continuously change the damping force characteristic, and may be configured to adjust the damping force discontinuously through two steps, or three or more steps.

Next, a configuration of the stroke-sensitive damper 6 as the mechanical damping force variable shock absorber mounted on the front wheel 2 side of the vehicle will be described with reference to FIG. 2.

The stroke-sensitive damper 6 is configured as a so-called twin tube-type hydraulic shock absorber, and includes the cylindrical cylinder 11 (hereinafter referred to as the inner tube 11) sealingly containing oil fluid as hydraulic fluid, and the bottomed cylindrical outer tube 12 formed so as to nave a larger diameter than the inner tube 11, and concentrically disposed so as to cover the inner tube 11 from outside.

A reservoir chamber 13, which sealingly contains gas together with the oil fluid therein, is formed between the inner tube 11 and the outer tube 12. A mounting eye 14 is provided on a bottom side of the outer tube 12. This mounting eye 14 constitutes a mounting member for mounting the outer tube 12 of the stroke-sensitive damper 6 to the front wheel 2 side of the vehicle.

A piston 15 as a movable partition is fitted in the inner tube 11 so as to be slidably displaceable. This piston 15 divides (partitions) an inside of the inner tube 11 into two chambers, a rod-side chamber 16 located on an upper side, and a bottom-side chamber 17 located on a lower side. Oil passages 15A and 15B, which establish communication between the rod-side chamber 16 and the bottom-side chamber 17 via the damping force generation mechanisms 35 and 36 that will be described below, are formed through the piston 15. The oil fluid is sealingly contained in the rod-side chamber 16 and the bottom-side chamber 17, and the compressible gas is sealingly contained in the reservoir 13 between the inner tube 11 and the outer tubs 12 together with the oil fluid. This gas may be air under an atmospheric pressure, or may be compressed nitrogen gas.

A rod guide 18 and an oil seal 19 are disposed on upper end sides of the inner tube 11 and the outer tubs 12 (an opening on one axial side). The upper end of the outer tube 12 is bent radially inwardly by a measure such as swaging, and fixes the rod guide 18 and the oil seal 19 by sandwiching them between the upper end of the outer tube 12 and the upper end of the inner tube 11. The rod guide 18 functions to slidably support the piston rod 21, which will be described below, and guide extension of the piston rod 21 outwardly from the inner tube 11 and the outer tube 12, and compression of the piston rod 21 into the inner tube 11.

On the other hand, a bottom valve 20 for generating the damping force is disposed on lower end sides of the inner tube 12 and the outer tube 12 (a bottom side on an opposite axial side). This bottom valve 20 functions to define the bottom-side chamber 17 in the inner tube 11 and the reservoir chamber 13 in the outer tube 12 by being located on the bottom side of the outer tube 21, and generate the damping force with the aid of the oil fluid flowing between the rod-side and bottom-side chambers 13 and 17.

An upper end (one end) side of the piston rod 21 penetrating axially (vertically) in the inner tube 11 extends so as to protrude out of the inner tube 11 and the outer tube 12 via the rod guide 18 and the oil seal 19. A lower end (opposite end) side of the piston rod 21 is coupled (fixed) to the piston 15 in the inner tube 11 via, for example, a nut 24, which will be described below, and this coupling allows the piston 15 to be displaced integrally with the piston rod 21 in the inner tube 11.

The piston rod 21 includes a rod main body 22 inserted on inner circumferential sides of the rod guide 18 and the oil seal 19, and extending out of the inner tube 11 and the outer tube 12, and a coupling rod 23 threadably engaged with a lower end side (an opposite-side end located in the inner tube 11) of the rod main body 22 and integrally coupled to the rod main body 22. The nut 24 is threadably engaged with a lower end side of this coupling rod 23, which allows the piston 15 to be fixed to the coupling rod 23 (i.e., the piston rod 21).

An axial hole 22A, which axially extends, is formed at a radial center of the rod main body 22. A through-hole 23A, which axially extends concentrically with the axial hole 22A, is formed at a radial center of the coupling rod 23. The axial hole 22A of the rod main body 22 has a lower end side in communication with the through-hole 23A of the coupling rod 23, and an upper end side extending to an intermediate position in the vicinity of a protruding end of the rod main body 22 and closed off to the outside.

The axial hole 22A of the rod main body 22 and the through-hole 23A of the coupling rod 23 form a pin insertion hole 21A of the piston rod 21. The metering pin 26, which will be described below, is inserted in this pin insertion hole 21A so as to be relatively displaceable to the piston rod 21 with a radial space generated therebetween. A rod internal passage 25 (i.e., an oil passage), which allows the oil fluid to flow therethrough in the piston rod 21, is formed between the pin insertion hole 21A and the metering pin 26.

An annular protrusion 24A, which radially inwardly protrudes, is provided on a lower end (opposite end) side of the nut 24. This annular protrusion 24A is formed in such a manner that a dimension of an inner diameter thereof generally matches a large-diameter axial portion 26A of the metering pin 26, which will be described below. The annular protrusion 24A of the nut 24 forms the second passage area adjustment mechanism 34, which will be described below, between the annular protrusion 24A and an outer circumferential surface of the metering pin 26, and has a function of variably adjusting a passage area of the rod internal passage 25 with respect to the bottom-side chamber 17 via the metering pin 26.

A lower end side (an end on the bottom valve 20 side) of the metering pin 26 is fixed to a central side of the bottom valve 20 via a support member 27 and the like, and is upwardly erected toward the pin insertion hole 21A of the piston rod 21. Due to this arrangement, an upper end side of the metering pin 26 is inserted in the pin insertion hole 21A of the piston rod 21, and a small-diameter axial portion 26C, which will be described below, extends into the axial hole 22A of the rod main body 22. The metering pin 26 includes the large-diameter axial portion 26A located closer to a proximal end aide (a lower side) thereof and cylindrically formed, a tapering axial portion 26S extending from an upper end of this large-diameter axial portion 26A axially upwardly in a tapering manner, and the small-diameter axial portion 26C having a free end at a distal end axially upwardly and cylindrically extending from an upper end of the capering axial portion 26B.

The large-diameter axial portion 26A of the metering pin 26 is formed in such a manner that a dimension of an outer diameter thereof generally matches the dimension of the inner diameter of the annular protrusion 24A of the nut 24. Therefore, when the piston rod 21 compresses into the inner tube 11, and the large-diameter axial portion 26A of the metering pin 26 is located on a radially inner side of the nut 24 (the annular protrusion 24A) as illustrated in FIG. 2, the passage area of the rod internal passage 25 is set to a minimum area by the second passage area adjustment mechanism 34, which will be described below, so that the rod internal passage 25 is brought into a state substantially regulating a flow of the oil fluid and is disconnected from and closed to the bottom-side chamber 17.

A piston-side spring bearing 28 is provided at a position upwardly spaced apart from the piston 15 by a predetermined dimension (for example, a position at which the coupling rod 23 is attached to the rod main body 22) on an outer circumferential side of the rod main body 22 of the piston rod 21. Further, a rod guide-side spring bearing 29 is provided at a position upwardly spaced apart from this piston-side spring bearing 28 by a predetermined dimension on the outer circumferential side of the rod main body 22. The rod main boy 22 is inserted on their respective inner circumferential sides of the piston-side spring bearing 28 and the rod guide-side spring bearing 29 in such a manner that the piston-side spring bearing 28 and the rod guide-side spring bearing 29 are axially relatively displaceable (slidable) along the outer circumferential surface of the rod main body 22.

A rebound spring 30, which is constituted by a coil spring, is disposed between the piston-side spring bearing 28 and the rod guide-side spring bearing 29 so as to allow the rod main body 22 to be inserted inside thereof. A cushion member 31, which is made of an annular elastic material, is provided on an upper surface side of the rod guide-side spring bearing 29 at a position opposite from the rebound spring 30. This cushion member 31 is also attached axially slidably along the outer circumferential surface of the rod main body 22 by being disposed so as to allow the rod main body 22 to be inserted therethrough.

When the piston rod 21 largely extends upwardly from the outer tube 12, the rod guide-side spring bearing 29 abuts against a lower surface of the rod guide 13 via the cushion member 31, and the rebound spring 30 is elastically deflected and deformed so as to be compressively deformed between the piston-side spring bearing 28 and the rod guide-side spring bearing 23. The protruding end side of the piston rod 21 is coupled to, for example, a vehicle body 1 side, and the bottom side of the outer tube 12 is coupled to a wheel (the front wheel 2) side via the mounting eye 14.

A radial passage hole 32 and the first passage area adjustment mechanism 33 are provided, at the coupling rod 23 of the piston rod. 21 on a position below the piston-side spring bearing 28. The passage hole 32 is a passage chat establishes communication between the rod-side chamber 16 and the rod internal passage 25, and the first passage area adjustment mechanism 33 functions to variably adjust a passage area of the passage hole 32 (i.e., a passage area between the rod-side chamber 16 and the rod internal passage 25) according to the stroke position of the piston rod 21.

In other words, the passage area between the rod-side chamber 16 and the rod internal passage 25 is changed by the first passage area adjustment, mechanism 33 according to a biasing force of the rebound spring 30 varying according to the stroke position of the piston rod 21. The passage area at this time is set so as to increase when the biasing force of the rebound spring 30 is weak, and reduce according to a gradual increase in the biasing force to finally fall to zero by being closed.

The annular protrusion 24A of the nut 24, which is threadably engaged with the lower end side of the coupling rod 23, forms the second passage area adjustment mechanism 34 between the annular protrusion 24A and the outer circumferential surface of the metering pin 26. The metering pin 26 includes the large-diameter axial portion 26A located closer to the proximal end side, the tapering axial portion 26B, and the small-diameter axial portion 26C having the free end at the distal end thereof. Therefore, the second passage area adjustment mechanism 34 functions to variably adjust the passage area (an area of a flow passage) of the rod internal passage 25 with respect to the bottom-side chamber 17 depending on which portion is located on the inner circumferential side of the annular protrusion 24A of the nut 24 among the axial portions 26A to 26C of the metering pin 26.

More specifically, when the piston rod 21 compresses so as to largely enter the inner tube 11 and the large-diameter axial portion 26A of the metering pin 26 is located on the inner circumferential side of the nut 24 (the annular protrusion 24A), the second passage area adjustment mechanism 34 adjusts the passage area of the rod internal passage 25 with respect to the bottom-side chamber 17 so as to minimize this area to substantially block the flow of the oil fluid therethrough.

On the other hand, when the piston rod 21 compresses to reach an intermediate position and the tapering axial portion 26B of the metering pin 26 is located on the inner circumferential side of the nut 24 (the annular protrusion 24A), the second passage area adjustment mechanism 34 adjusts the passage area of the rod internal passage 25 with respect to the bottom-side chamber 17 so as to gradually increase this area according to extension of the piston rod 21. Further, when the piston rod 21 largely extends out of the outer tube 12 and the small-diameter axial portion 26C of the metering pin 26 is located on the inner circumferential side of the nut 24 (the annular protrusion 24A), the second passage area adjustment mechanism 34 adjusts the passage area of the rod internal passage 25 with respect to the bottom-side chamber 17 so as to maximize this area.

The extension-side damping force generation mechanism 35, which generates the damping force during an extension stroke corresponding to an extension side of the piston rod 21, and the compression-side damping force generation mechanism 36, which generates the damping force daring a compression stroke corresponding to a compression side of the piston rod 21, are provided at the piston 15 in the inner tube 11. The extension-side damping force generation mechanism 35 is disposed on the bottom-side chamber 17 side that corresponds to the lower side (the opposite axial side) of the piston 15. The compression-side damping force generation mechanism 36 is disposed on the rod-side chamber 16 side that corresponds to the upper side (the one axial side) of the piston 15.

Figure 3:
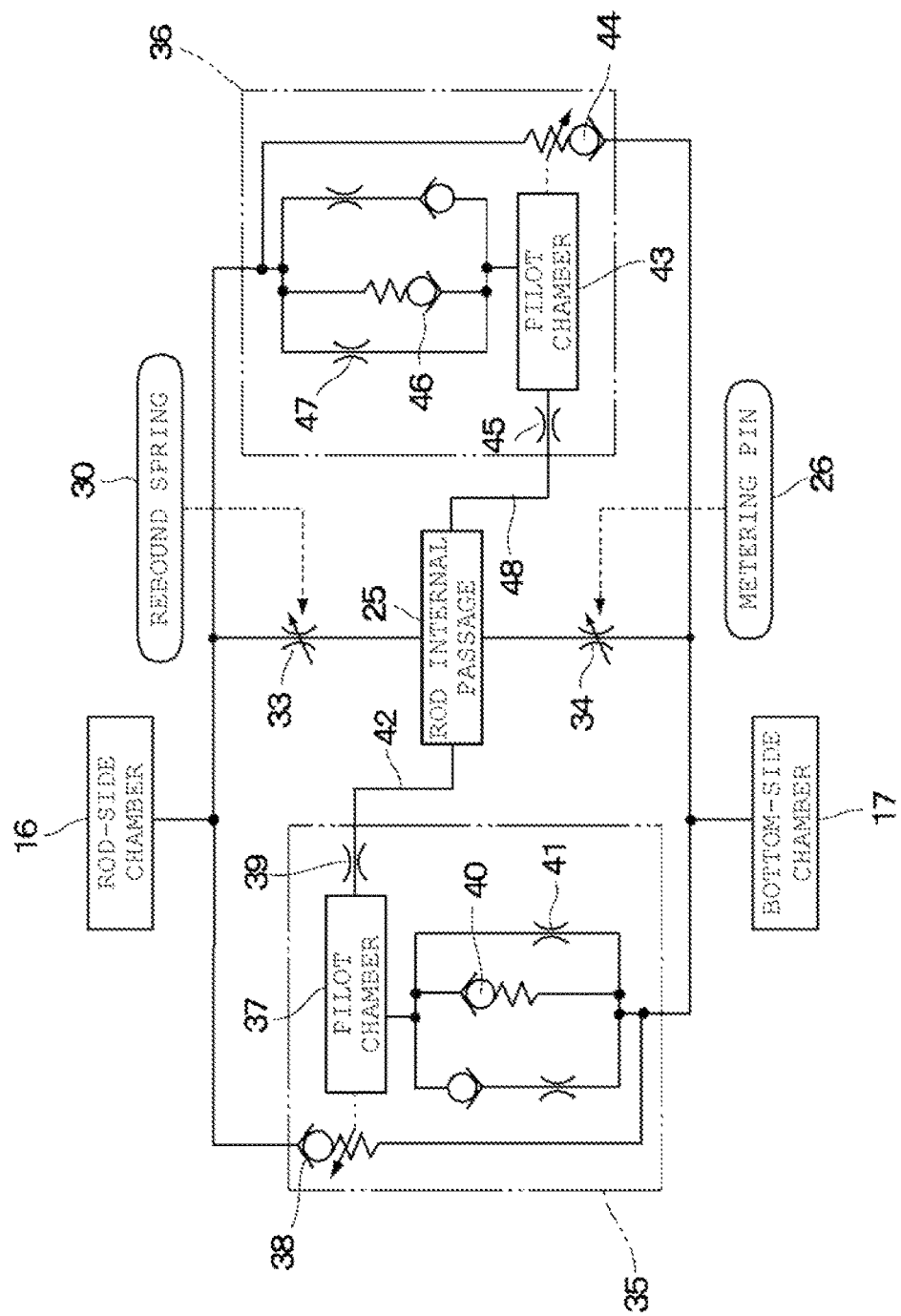
FIG. 3 illustrates a configuration of a circuit of the stroke-sensitive damper illustrated in FIG. 2.

As illustrated in FIGS. 2 and 3, the extension-side damping force generation mechanism 35 includes a hydraulic pilot-type damping valve 38 including a pilot chamber 37 between the damping valve 38 and the piston 15, an orifice 39 provided between the rod internal passage 25 and the pilot chamber 37, and a disk, valve 40 and an orifice 41 arranged in parallel with each other between the pilot chamber 37 and the bottom-side chamber 17.

Further, a radial passage hole 42, which establishes communication between the rod internal passage 25 and the pilot chamber 37, is formed at the coupling rod 23 of the piston rod 21, and this passage hole 42 is connected to the pilot chamber 37 via the orifice 39. A valve-opening pressure of the hydraulic pilot-type damping valve 38 is set so as to change according to a pressure in the pilot chamber 37. Then, when the damping valve 38 is opened, the oil fluid in the rod-side chamber 16 flows into the bottom-side chamber 17 via the oil passage 15A of the piston 15.

The compression-side damping force generation mechanism 36 includes a hydraulic pilot-type damping valve 44 including a pilot chamber 43 between the damping valve 44 and the piston 15, an orifice 45 provided between the rod internal passage 25 and the pilot chamber 43, and a disk valve 46 and an orifice 47 arranged in parallel with each other between the pilot chamber 43 and the rod-side chamber 16.

Further, a radial passage hole 48, which establishes communication between the rod internal passage 25 and the pilot chamber 43, is formed at the coupling rod 23 of the piston rod 21, and this passage hole 48 is connected to the pilot chamber 43 via the orifice 45. A valve-opening pressure of the hydraulic pilot-type damping valve 44 is set so as to change according to a pressure in the pilot chamber 43. Then, when the damping valve 44 is opened, the oil fluid in the bottom-side chamber 17 flows into the rod-side chamber 16 via the oil passage 15B of the piston 15.

As indicated in a hydraulic circuit diagram illustrated in FIG. 3, the stroke-sensitive damper 6 is configured in such a manner that the extension-side damping force generation mechanism 35 and the compression-side damping force generation mechanism 36 are arranged in parallel with each other between the rod-side chamber 16 and the bottom-side chamber 17. The rod internal passage 15 in the piston rod 21 is in communication with the rod-side chamber 16 via the first passage area adjustment mechanism 33 having the passage area variably adjusted by the rebound spring 30 and the like, and is in communication with the bottom-side chamber 17 via the second passage area adjustment mechanism 34 having the passage area variably adjusted by the metering pin 26 and the like. Then, the pilot chamber 37 of the extension-side damping force generation mechanism 35 is in communication with the rod internal passage 25 via the orifice 39 and the passage hole 42, and the pilot chamber 43 of the compression-side damping force generation mechanism 36 is in communication with the rod internal passage 25 via the orifice 45 and the passage hole 43.

The stroke-sensitive damper 6 includes the communication passage that establishes communication between the two chambers, the rod-side chamber 16 and the bottom-side chamber 17 so as to allow the oil fluid as the hydraulic fluid to flow therethrough (including the oil passages 15A and 15B of the piston 15, the rod internal passage 25, and the like), and the damping force generation apparatus disposed in this passage and configured to generates the damping force by suppressing the flow of the oil fluid that is caused by a movement of the piston 15. This damping force generation apparatus includes the above-described first and second passage area adjustment mechanism 33 and 34, and the above-described extension-side and compression-side damping force generation mechanisms 35 and 36.

Figure 4:
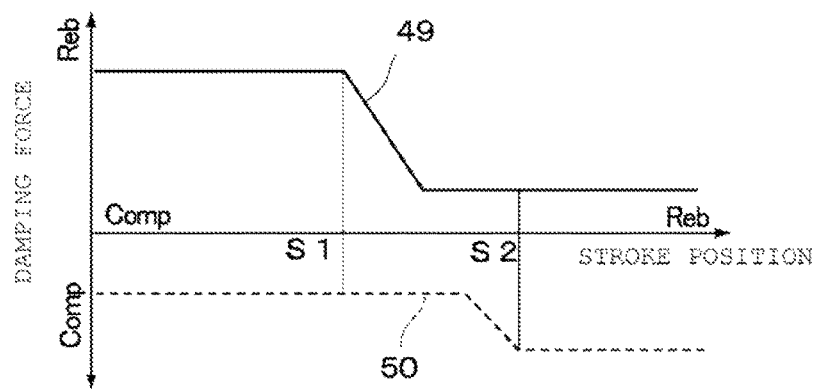
FIG. 4 illustrates characteristic lines each representing a relationship between a stroke position and a damping force of the stroke-sensitive damper.

Due to this configuration, the stroke-sensitive damper 6 largely changes the extension-side damping force around a stoke position S1 as indicated by a characteristic line 49 drawn with a solid line in FIG. 4, and largely changes the compression-side damping force around a stroke position S2 (S2>S1) as indicated by a characteristic line 50 drawn with a dotted line in FIG. 4.

In this case, a right-side range located on a further extension (Reb) side beyond the stroke position 82 illustrated in FIG. 4 corresponds to a maximum length-side predetermined range where the piston rod 21 extends out of the inner tube 11 beyond a maximum length-side predetermined position, and has such a maximum length-side characteristic that the extension-side damping force is set into a soft state as indicated by the characteristic line 49 drawn with the solid line in FIG. 4, and the compression-side damping force is set into a hard state as indicated, by the characteristic line 50 drawn with the dotted line in FIG. 4. According to this maximum length-side characteristic, the extension-side damping force is set into the soft state and the compression-side damping force is set into the hard state regardless of whether the piston speed is slow or fast.

On the other hand, a left-side range located on a further compression (Comp) side beyond the stroke position S1 illustrated in FIG. 4 corresponds to a minimum length-side predetermined range where the piston rod 21 enters the inner tube 11 beyond a minimum length-side predetermined position, and has such a minimum length-side characteristic that the extension-side damping force is set into the hard stats as indicated by the characteristic line 43 drawn with the solid line in FIG. 4, and the compression-side damping force is set into the soft state as indicated by the characteristic line 50 drawn with the dotted line in FIG. 4. According to this minimum length-side characteristic, the extension-side damping force is set into the hard state and the compression-side damping force is set into the soft state regardless of whether the piston speed is slow or fast.

In other words, the stroke-sensitive damper 6 includes the first and second passage area adjustment mechanisms 33 and 34 that adjust the passage area of the communication passage according to the stroke position of the piston rod 21 together with the extension-side and compression-side damping force generation mechanisms 35 and 36 so as to have at least any one of the maximum length-side characteristic, according to which the extension-side damping force is set into the soft state and the compression-side damping force is set into the hard side in the range where the piston rod 21 extends out of the inner tube 11 beyond the maximum length-side predetermined position (for example, the position S2), and the minimum length-side characteristic, according to which the extension-side damping force is set into the hard state and the compression-side damping force is set into the soft state in the range where the piston rod 21 enters the inner tube 11 beyond the minimum length-side predetermined position (for example, the position S1).

Figure 5:
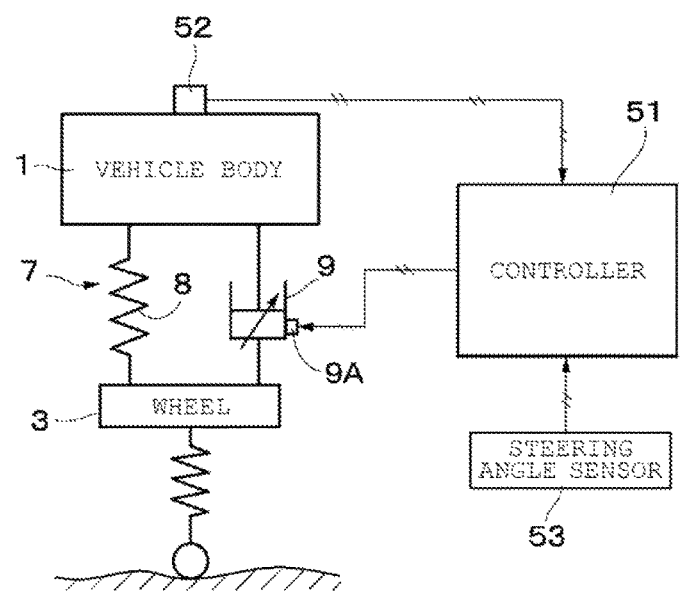

Next, a configuration of the damping force control damper 9 mounted on the rear wheel 3 side of the vehicle will be described with reference to FIG. 5. The control signal is output from, the controller 51 as a control apparatus to the actuator 9A of the damping force control damper 9, and the damping force control damper 9 functions to variably control the damping force according to the control signal at this time.

More specifically, the damping force generated by the damping force control damper 9 is variably adjusted by the actuator 9A according to, for example, the conditions under which the vehicle is driven that include the state of the road surface. The controller 51 includes, for example, a microcomputer. An input side of the controller 51 is connected to a sprung acceleration sensor 52, a steering angle sensor 53, and the like. An output side of the controller 51 is connected to the actuator 9A of the damping force control, damper 9, and the like.

The sprang acceleration sensor 52 provided to the vehicle body 1 is mounted on the vehicle body 1 at a position in the vicinity of the damping force control damper 9 to detect a vertical vibration acceleration on the vehicle body 1 side, which corresponds to a so-called sprung side. Then, the sprung acceleration sensor 52 detects a vertical vibration acceleration of the vehicle body 1, and outputs a signal of this detection to the controller 51. The steering angle sensor 53 is mounted on the vehicle body 1 side. The steering angle sensor 53 functions to detect a steering angle when a driver of a vehicle performs a steering operation on a steering wheel (not illustrated) to try to, for example, turn the vehicle, and output a signal, of this detection to the controller 51.

More specifically, the controller 51 read in the conditions under which the vehicle is driven from the sprung acceleration sensor 52, the steering angle sensor 53, and the like, and outputs the control signal to the electronically controllable actuator 9A to improve the maneuvering stability and the ride comfort of the vehicle. Then, the damping force control damper 9 is configured to be able to variably set, for example, a roll stiffness of the vehicle body 1 on one rear wheel 3 side to increase or reduce it by electronic control according to the control signal output from she controller 51.

More specifically, the damping force control damper 9 is configured to be able to variably adjust the damping force on the rear wheel 3 side by the actuator 9A in such a manner that, as a roll angle of the vehicle body 1 increases when the driver steers the vehicle, a pitch angle toward the front side of the vehicle increases to orient the vehicle body 1 into a nosedive-like posture. The stroke-sensitive damper 6 on the front wheel 2 side is configured to permit the vehicle body 1 to be oriented into the nosedive-like posture on the front wheel 2 side of the vehicle at this time.

The four-wheeled automobile, which is the compact car according to the present embodiment, is configured in the above-described manner. Next, an operation of the stroke-sensitive damper 6 mounted on the front wheel 2 side of the vehicle will be described.

When the stroke-sensitive damper 6 is in the maximum length-side predetermined range where the piston rod 21 extends out of the inner tube 11 beyond the maximum length-side predetermined position (for example, the stroke position S2 illustrated in FIG. 4), the cushion member 31 is in abutment with the rod guide 18 with the rebound spring 30 deflected and deformed so as to be elastic-ally compressed. As a result, the first passage area adjustment mechanism 33 closes the radial passage hole 32 formed at the coupling rod 23 so as to disconnect the radial passage hole 32 from the rod-side chamber 16.

Further, in this maximum length-side predetermined range, the second passage area adjustment mechanism 34 maximises the passage area, of the rod internal passage 25 due to the small-diameter axial portion 26C of the metering pin 26 that is placed on the radially inner side of the nut 24 (the annular protrusion 24A). In this maximum length-side predetermined range, the rod internal passage 25 is in communication with she bottom-side chamber 17 via the second passage area adjustment mechanism 34, and both the pilot chamber 37 of the extension-side damping force generation mechanism 35 and the pilot chamber 43 of the compression-side damping force generation mechanism 36 are in communication with the bottom-side chamber 17 via the passage holes 42 and 48, the rod internal passage 25, and the second passage area adjustment mechanism 34.

In this maximum length-side predetermined range, daring the extension stroke in which the piston rod 21 extends out of the inner tube 11, the piston 15 is upwardly slidably displaced toward the rod-side chamber 16 side, whereby the pressure in the rod-side chamber 16 increases while the pressure in the bottom-side chamber 17 reduces. Therefore, the pressure in the rod-side chamber 16 is applied to the damping value 38 of the extension-side damping force generation mechanism 35 via the extension-side oil passage 15A formed through the piston 15. At this time, the pilot chamber 37, which applies the pilot pressure to the damping valve 38 in a valve-closing direction, is in communication with the bottom-side chamber 17 via the passage hole 42, the rod internal passage 25, and the second passage area adjustment mechanism 34. Therefore, the pilot chamber 37 is brought into a pressure state close to the bottom-side chamber 17, and the pilot pressure therein reduces.

As a result, the damping valve 38 is relatively easily separated from a valve seat to be opened according to the reduction in the pilot pressure received from the pilot chamber 37, thereby permitting the oil fluid to flow from the rod-side chamber 16 to the bottom-side chamber 17. Due to this permission, the damping force of the extension-side damping force generation mechanism 35 reduces on the stroke position S2 side, thereby establishing the extension-side damping force set into the soft state, as indicated by the characteristic line 49 drawn with the solid line in FIG. 4.

On the other hand, in this maximum length-aide predetermined range, during the compression stroke in which the piston rod 21 enters the inner tube 11, the piston 15 is slidably displaced downwardly toward the bottom-side chamber 17 side, whereby the pressure in the bottom-side chamber 17 increases while the pressure in the rod-side chamber 16 reduces. Therefore, the hydraulic oil in the bottom-side chamber 17 is applied to the damping valve 44 of the compress ion-side damping force generation mechanism 36 via the compress ion-side oil passage 15B formed through the piston 15. At this time, the pilot chamber 43, which applies the pilot pressure to the damping valve 44 in a valve-closing direction is in communication with the bottom-side chamber 17 via the passage hole 43, the rod internal passage 25, and the second passage area adjustment mechanism 34. Therefore, the pilot chamber 43 is brought into a pressure state close to the bottom-side chamber 17, and the pilot pressure therein increases together with the increase in the pressure in the bottom-side chamber 17.

In this state, when the piston speed is slow, the increase in the pressure in the pilot chamber 43 can follow the increase in the pressure in the bottom-side chamber 17, whereby the damping valve 44 is brought into a state difficult to be separated from the valve seat according to the increase in the pressure in the pilot chamber 43. Therefore, the oil fluid from the bottom-side chamber 17 passes through the pilot chamber 43 from the second passage area adjustment mechanism 34, the rod internal passage 25, and the passage hole 43, and flows into the rod-side chamber 16 via the orifice 47 in parallel with the disk valve 46, thereby generating the damping force according to an orifice characteristic (the damping force is generally proportional to a square of the piston speed). Therefore, the damping force has such a characteristic with respect to the piston speed that the damping force increases at a relatively higher rate wish respect to an increase in the piston speed.

Further, even when the piston speed is faster than the above, the damping valve 44 is also in the state difficult to be separated from the valve seat, and the oil fluid from the bottom-side chamber 17 passes through the pilot chamber 43 from the second passage area adjustment mechanism 34, the rod internal passage 25, and the passage hole 48, and flows into the rod-side chamber 16 while opening the disk valve 46, thereby generation the damping force according to a valve characteristic (the damping force is generally proportional to the piston speed). Therefore, the damping force has such a characteristic with respect to the piston speed that the damping force increases at a slightly lower rate with respect to the increase in the piston speed.

In this manner, the damping force generated by the compression-side damping force generation mechanism 36 during the compression stroke is higher than the damping force during the extension stroke (the characteristic line 49 drawn with the solid line) on the stroke position S2 side as indicated by the characteristic line 50 drawn with the dotted line in FIG. 4, and the compression-side damping force generated by the damping force generation mechanism 36 is set into the hard state.

Even during the compression stroke in the maximum length-side predetermined range, once the piston speed reaches a further fast-speed region, for example, when an impact/shock occurs due to an uneven road surface or the like, the increase in the pressure in the pilot chamber 43 becomes unable to follow the increase in the pressure in the bottom-side chamber 17. Regarding a relationship between forces based on a differential pressure applied to the damping valve 44 of the compression-side damping force generation mechanism 36, the force applied from the oil passage 15B formed through the piston 15 in the valve-opening direction exceeds the force applied from the pilot chamber 43 in the valve-closing direction. Therefore, in this region, the damping valve 44 is opened to be separated from the valve seat according to the increase in the piston speed, resulting in a stop or reduction, or the increase in the damping force.

The damping force at this time has such a characteristic with respect to the piston speed that the damping force increases at an almost zero rate with respect to the increase in the piston speed. Therefore, for example, when the impact/shock occurs due to the uneven road surface or the like, which leads to a fast piston speed and a relatively high frequency, the damping force generation apparatus prevents the damping force from increasing or allows the damping force to less increase with respect to the increase in the piston speed as described above, thereby succeeding in sufficiently absorbing the shock.

In this manner, the right-side range located on the further extension (Reb) side beyond the stroke position S2 illustrated in FIG. 4 (the right side in FIG. 4) corresponds to the maximum length-side predetermined range where the piston rod 21 extends out of the inner tube 11 beyond the maximum length-side predetermined position, and has such a maximum length-side characteristic that the extension-side damping force is set into the soft state as indicated by the characteristic line 49 drawn with the solid line in FIG. 4, and the compression-side damping force is set into the hard state as indicated by the characteristic line 50 drawn with the dotted line in FIG. 4. According to this maximum length-side characteristic, she extension-side damping force is set into the soft state and the compression-side damping force is set into the hard state regardless of whether the piston speed is slow or fast.

Next, in the minimum length-side predetermined position where the piston, rod 21 enters the inner tube 11 beyond the minimum length-side predetermined position (for example, the stroke position S1 illustrated in FIG. 4), the rebound spring 30 is brought into a free length state as illustrated in FIG. 2 without being elastically deformed (compressed), so that the first passage area adjustment mechanism 33 is not pressed by the biasing force of the rebound spring 30, thereby maximizing the passage area defined by the first passage area adjustment mechanism 33 so as to maintain the communication between she radial passage hole 32 formed at the coupling rod 23 and the rod-side chamber 16.

Further, in the minimum, length-predetermined range, the large-diameter axial portion 26A of the metering pin 26 is placed on the radial inner side of the nut 24 (the annular protrusion 24A), whereby the second passage area adjustment mechanism 34 sets the passage area of the rod internal passage 25 to a minimum area to disconnect the rod internal passage 25 from the bottom-side chamber 17 and close the rod internal passage 25 so the bottom-side chamber 17. However, in this minimum length-side predetermined range, the rod internal passage 25 is in communication with the rod-side chamber 16 via the above-described passage hole 32, and both the pilot chamber 37 of the extension-side damping force generation mechanism 35 and the pilot chamber 43 of the compression-side damping force generation mechanism 36 are in communication with the rod-side chamber 16 via the communication holes 42 and 48, the rod internal passage 25, and the passage hole 32.

During the extension stroke in which the piston rod 21 extends out of the inner tube 11 in this minimum, length-side predetermined range, the piston 15 is slidably displaced upwardly toward the rod-side chamber 16 side, whereby the pressure in the rod-side chamber 16 increases while the pressure in the bottom-side chamber 17 reduces. Therefore, the pressure in the rod-side chamber 16 is applied to the damping valve 38 of the extension-side damping force generation mechanism 35 via the extension-side oil passage 15A formed through the piston 15. At this time, the pilot chamber 37, which applies the pilot pressure to the damping valve 33 in the valve-closing direction, is in communication with the rod-side chamber 16 via the passage hole 42, the rod internal passage 25, and the passage hole 32. Therefore, the pilot chamber 37 is brought into a pressure state close to the rod-side chamber 16, and the pilot pressure therein increases according to the increase in the pressure in the rod-side chamber 16.

In this state, when the piston speed is slow, the increase in the pressure in the pilot chamber 37 can follow the increase in the pressure in the rod-side chamber 16, whereby the damping valve 33 is brought into a state difficult to be separated, from the valve seat due to a reduction in a received differential pressure. Therefore, the oil fluid from the rod-side chamber 16 passes through the pilot chamber 37 from the passage hole 32, the rod internal passage 25, and the passage hole 42, and flows into the bottom-side chamber 17 via the orifice 41 in parallel with the disk valve 40, thereby generating the damping force according to the orifice characteristic (the damping force is generally proportional to the square of the piston speed). Therefore, the damping force has such a characteristic with respect to the piston speed that the damping force increases at a relatively higher rate with respect to the increase in the piston speed.

Further, even when the piston speed is faster than the above, the oil fluid in the rod-side chamber 16 passes through the pilot chamber 37 from the passage hole 32, the rod internal passage 25, and the passage hole 42 without the damping valve 38 separated from the valve seat, and flows into the bottom-side chamber 17 while opening the disk valve 40, thereby generating the damping force according to the valve characteristic (the damping force is generally proportional to the piston speed). Therefore, the damping force has such a characteristic with respect to the piston speed that the damping force increases at a slightly lower rate with respect to the increase in the piston speed. In this manner, a strong damping force is generated daring the extension stroke, establishing the extension-side damping force set into the hard state.

On the other hand, during the compression stroke in which the piston rod 21 enters the inner tube 11 in this minimum length-side predetermine range, the piston 15 is slidably displaced downwardly toward the bottom-side chamber 17 side, whereby the pressure in the bottom-side chamber 17 increases while the pressure in the rod-side chamber 16 reduces. Therefore, the hydraulic oil in the bottom-side chamber 17 is applied to the damping valve 44 of the compression-side damping force generation mechanism 36 via the compression-side oil passage 15B formed through the piston 15. At this time, the pilot chamber 43, which applies the pilot pressure to the damping valve 44 in the valve closing direction, is in communication with the rod-side chamber 16 via the passage hole 48, the rod internal passage 25, and the passage hole 32. Therefore, the pilot chamber 43 is brought into a pressure state close to the rod-side chamber 16, and the pilot pressure therein reduces. Therefore, the damping valve 44 starts receiving a higher differential pressure to be relatively easily separated from the valve seat to be opened, thereby permitting the oil fluid to flow toward the rod-side chamber 16 side. As a result, a weaker damping force is generated during the compression stroke than the damping force generated during the extension stroke, establishing the compression-side damping force in the soft state.

In this manner, the range located on the further compression side beyond the stroke position S1 illustrated in FIG. 4 (the left side in FIG. 4) corresponds to the minimum length-side predetermined range where the piston rod 21 enters the inner tube 11 beyond the minimum length-side predetermined position, and has such a minimum length-side characteristic that the extension-side damping force is set into the hard state as indicated by the characteristic line 49 drawn with the solid line in FIG. 4, and the compression-side damping force is set into the soft state as indicated by the characteristic line 50 drawn with the dotted line in FIG. 4. According to this minimum length-side characteristic, the extension-side damping force is set into the hard state and the compression-side damping force is set into the soft state regardless of whether the piston speed is slow or fast. Further, for example, when the piston rod 21 is located at a neutral position, the extension-side damping force is set into a medium state and the compression-side damping force is set into the soft state regardless of whether the piston speed is slow or fast.

Next, an operation of the damping force control damper 9 mounted on the rear wheel 3 side of the vehicle will be described. The damping force control damper 9 is configured to be able to variably set, for example, the roll stiffness of the vehicle body 1 on the rear wheel 3 side to increase or reduce it by the electronic control according to the control signal output from the controller 51. More specifically, the controller 51 read in the conditions under which the vehicle is driven from the sprung acceleration sensor 52, the steering angle sensor 53, and the like, and outputs the control signal to the electronically controllable actuator 9A to improve the maneuvering stability and the ride comfort of the vehicle.

This configuration allows the damping force control damper 9 to variably adjust the damping force on the rear wheel 3 side by the actuator 3A in such a manner that, as the roll angle of the vehicle body 1 increases when the driver steers the vehicle, the pitch angle toward the front side of the vehicle increases to orient the vehicle body 1 into the nosedive-like posture. The stroke-sensitive damper 6 on the front wheel 2 side is configured to permit the vehicle body 1 to be oriented info the nosedive-like posture on the front wheel 2 side of the vehicle at this time.

In this manner, the roll stiffness on the front wheel 2 side is set to a lower value and the roll stiffness on the rear wheel 3 side is set to a higher value, which leads to a so-called diagonal roll, thereby improving responsiveness to a yaw when the driver steers the vehicle. More specifically, the stroke-sensitive damper 6, which provides a low roll stiffness, is used on the front wheel 2 side, and the damping force control damper 9, which can control the roll stiffness to an appropriate degree by the electronic control, is used on the rear wheel 3 side, whereby responsiveness to a steering operation can be significantly improved compared to the vehicle according to the conventional technique, and she inexpensive stroke-sensitive damper 6 can be used on the front wheel 2 side with she expensive damping force control damper 9 used only on the rear wheel 3 side. As a result, for example, the number of harnesses of the vehicle body and the number of ECO driving circuits can be reduced, whereby the system can be simplified.

Figure 6:
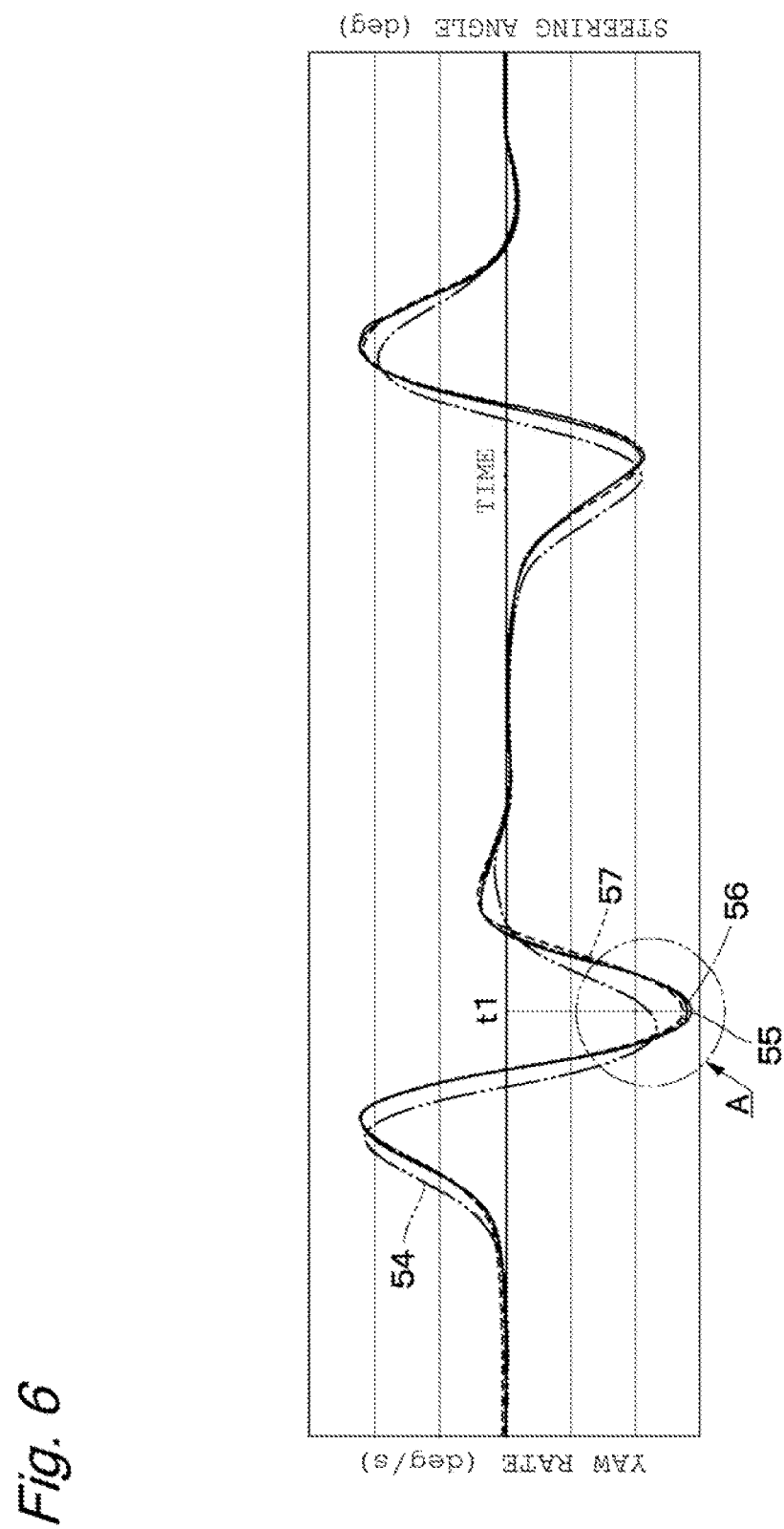

FIG. 6 illustrates data, acquired from a test conducted on actual vehicles, i.e., illustrates characteristic lines 54 to 57 each representing a characteristic of a steering angle or a yaw rate of the running vehicle. The characteristic line 54 drawn with a chain double-dashed line represents a characteristic of the steering angle that corresponds to an operation performed on the steering wheel when the driver repeatedly changes a lane while the vehicle is running. The characteristic line 55 drawn with a solid line represents a characteristic of the yaw rate at the vehicle to which the present embodiment is applied during this operation performed on the steering wheel (the characteristic line 54).

On the other hand, a characteristic line 56 drawn with a chain line represents a characteristic of the yaw rate at a first comparative example using dampers similar to the damping force control damper 9 on both the front wheel side and the rear wheel side (hereinafter referred to as an example using a semi-active damper on each of four wheels). The characteristic line 57 drawn with a dotted line represents a characteristic of the yaw rate at a second comparative example using general-purpose shock absorbers (dampers each having a damping force characteristic adjusted to a medium characteristic in advance) on both the front wheel side and the rear wheel side (hereinafter referred to as a conventional-type example).

Figure 7:
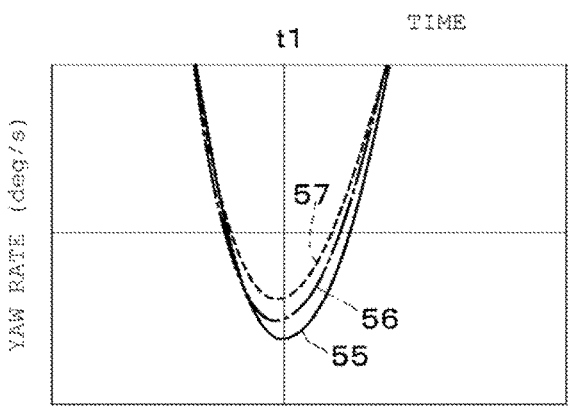
FIG. 7 is an enlarged view illustrating main parts of the characteristic lines illustrated in FIG. 6.

The characteristic lines 55, 56, and 57 illustrated in FIG. 6 also reveal that an excellent characteristic of the yaw rate can be achieved at the vehicle according to the present embodiment using the stroke-sensitive damper 6 on the front wheel 2 side and the damping force control damper 9 on the rear wheel 3 side. FIG. 7 illustrates portions of the characteristic lines 55, 56, and 57 indicated by an arrow A in FIG. 6 in an enlarged manner. As also understood from FIG. 7, the characteristic line 55 corresponding to the present embodiment exhibits a higher yaw rate when the driver turns the steering wheel (in the vicinity of time t1) than the characteristic lines 56 and 57 corresponding to the first and second comparative examples, thereby achieving a characteristic most responsive to the steering operation.

More specifically, according to the present embodiment, the stroke-sensitive damper 6 mounted on the front wheel 2 side provides only a low stiffness in a roll input direction in response to a steering input to thereby result in generation of a large roll at this time, but can set strong damping at the time of a roll return. Therefore, after a behavior of the vehicle body 1 largely changes, for example, when the driver returns the steering wheel, the present embodiment can effectively control a vibration of the vehicle body 1 and can also reduce an unstable behavior of the vehicle, thereby succeeding in more smoothly stabilizing a movement of the vehicle body 1 than the second comparative example (the characteristic line 57) that is the conventional-type example.

Figure 8:
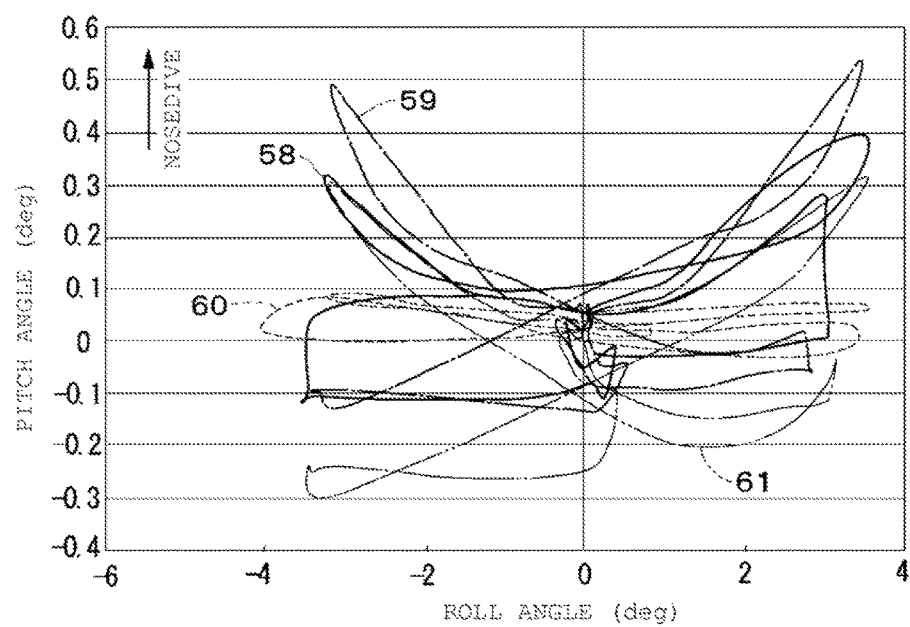
FIG. 8 illustrates characteristic lines each representing a characteristic of a relationship between a roll angle and a pitch angle when a vehicle is being steered in comparison between the vehicle according to the present embodiment and the comparative examples.

Next, FIG. 8 illustrates data acquired from a test conducted on the actual vehicles, i.e., illustrates characteristic lines 58 to 61 each representing a characteristic of a lateral roll angle and a longitudinal pitch angle when the driver steers the vehicle while the vehicle is running. The characteristic line 58 drawn with a solid line represents a characteristic of the roll angle and the pitch angle at the vehicle to which the present embodiment is applied.

On the other hand, the characteristic line 59 drawn with a chain double-dashed line represents a characteristic of the roll angle and the pitch angle at the example using the semi-active damper on each of the four wheels (the first comparative example). The characteristic line 60 drawn with a dotted line represents a characteristic of the roll angle and the pitch angle at the second comparative crams is that is the conventional-type example. The characteristic line 61 drawn with a chain double-dashed line represents a characteristic at a third comparative example using the conventional-type shock absorber on the front wheel 2 side, and the semi-active damping force control damper 9 on the rear wheel 3 side.

The present embodiment using the stroke-sensitive damper 6 on the front wheel 2 side and the damping force control damper 9 on the rear wheel 3 side can realize, with lower cost, a suspension system having a similar function to the first comparative example that is the example using the semi-active damper on each of the four wheels (refer to the characteristic line 59 drawn with the chain double-dashed line in FIG. 8*b*. Further, the example using the semi-active damper on each of the four wheels can tune the ride comfort and the maneuvering stability of the vehicle suitably to each other almost only by requiring the driver to adjust a control parameter. On the other hand, the present embodiment includes the stroke-sensitive damper 6 on the front wheel 2 side and the semi-active damper on the rear wheel 3 side, and thereby can realize a function similar to the example using the semi-active damper on each of the four wheels by tuning the ride comfort and the maneuvering stability of the vehicle in terms of both the control system and the mechanical system simultaneously. This advantage cannot be achieved from the control that only controls the semi-active dampers mounted on two wheels.

On the other hand, the following difference is found out when the present embodiment (refer to the characteristic line 58 in FIG. 8) is compared with the third comparative example (refer to the characteristic line 81 in FIG. 8) using the conventional-type shock absorber on the front wheel 2 side and the semi-active damping force control damper 9 on the rear wheel 3 side.

Compared with the present embodiment (the characteristic line 58), the third comparative example (the characteristic line 61 drawn with the chain double-dashed line in FIG. 8) cannot sufficiently damp the roll on the front wheel 2 side, thereby failing to stabilize the behavior of the vehicle body after the driver sharply turns the steering wheel to thereby necessitate a corrective steering operation. Further, the third comparative example does not have a Skyhook function on the front wheel side, which prevents the rear wheel side from sufficiently exerting the function of the Skyhook control in consideration of balance between the front-side and the rear side. As a result, compared to the present embodiment (the stroke-sensitive damper 6 on the front wheel 2 side), the third comparative example highly likely results in excessive bouncing on the front wheel side especially on a bad road, and thus excessive pitching therefrom, thereby largely impairing the ride comfort.

In other words, the third comparative example easily leads to a poor ride comfort, and has a characteristic similar to the second comparative example including the conventional-type dampers on all of the four wheels (refer to the characteristic line 60 drawn with the dotted line in FIG. 8). Compared to the second comparative example using the conventional-type damper on each of the four wheels, in the present embodiment, the pitch angle also increases in response to the roll movement as indicated by the characteristic line 58 drawn with the solid line, so that the present embodiment realizes the diagonal behavior.

The third comparative example, which includes the conventional-type damper on the front wheel side and the semi-active damper on the rear wheel side (the characteristic line 61 drawn with the chain double-dashed line in FIG. 8), realizes one diagonal behavior but also involves a movement of a squat and fails to stabilize the behavior after the driver returns the steering wheel when changing the lane. In the third comparative example (the characteristic line 61), the vehicle shows a nosedive behavior when the driver starts turning the steering angle, but shows a large squat behavior due to insufficiency of the damping force of the shock absorber (the conventional-type damper) on the front wheel side when the driver return the steering wheel to an original state.

Further, the four-wheeled automobile such as the compact car according to the present embodiment is configured to use the stroke-sensitive damper 6 on the front wheel 2 side and the damping force control damper 9 on the rear wheel 3 side. This configuration allows the four-wheeled automobile to have a compact layout even when the stroke-sensitive damper 6 mounted on the front wheel 2 side is used as a strut, and has the following advantage to facilitate the layout.

The strut is often used as the shock absorber on the front wheel 2 side of the vehicle. However, the strut has a large diameter, which easily becomes a layout obstacle to especially arrangement of a semi-active shock absorber (for example, the damping force control damper 9) including a damping valve (for example, the actuator 9A) attached to the side of the shock absorber and provided outside the cylinder. On the other hand, the stroke-sensitive damper 6 is mounted on the front wheel 2 side, which can eliminate a restriction imposed on the layout.

Further, one advantage frets the flexibility in the design of the stroke-sensitive damper 6 is that, because the front wheel 2 side is less likely to subject to a change in a vehicle height doe to the number of passengers and a load weight than on the rear wheel 3 side, the front wheel 2 side allows an insensible region to be set small and can improve the design flexibility, thereby succeeding in sufficiently exerting the function of the stroke-sensitive damper 6.

More specifically, the stroke-sensitive damper 6 is configured to change a damping force coefficient at a lower rate, for example, in the vicinity of 1 G (a gravitational acceleration) so as to prevent the characteristics of the ride comfort and the maneuvering stability from changing due to differences in the number of passengers and the load weight. Especially, the rear wheel 3 is more susceptible to the changes in the number of passengers and the load weight than the front wheel 2, which raises a necessity of setting a wide range where the damping coefficient changes at the lower rate (the insensitive region). Therefore, in a case where the stroke-sensitive damper 6 is mounted on the rear wheel 3 side, sufficient exertion of the function thereof requires provision of a point having a sudden change in the rate at which the damping force coefficient changes, resulting in an increase in a shock (a sound and a vibration) at this sudden change and thus a difficulty in the design, leading to such a possibility that the function of the stroke-sensitive damper 6 may have to be slightly compromised.

Therefore, according to the present embodiment, the vehicle can utilize the advantages of the stroke-sensitive damper 6 and the damping force control damper 9, improve the steering operability, the maneuvering stability, and the ride comfort while the vehicle is running, and improve the workability at the time of the manufacturing and the assembling. In addition thereto, the vehicle can use the inexpensive stroke-sensitive damper 6 on the front wheel 2 side with the expensive damping force control damper 9 used only on the rear wheel 3 side.

The present embodiment has been described assuming that the state in which the vehicle is driven is detected with use of the sprung acceleration sensor 52 and the steering angle sensor 53 to control the damping force control damper 9 on the rear wheel 3 side by the controller 51 by way of example. However, the present invention is not limited thereto, and may be configured to detect the state (condition) in which the vehicle is driven with use of, for example, a vehicle height sensor, an in-vehicle camera, and the like, and output a signal of this detection to the controller.

Further, the present embodiment has been described assuming that the stroke-sensitive damper 6 mounted on the front wheel 2 side is embodied by the hydraulic shock absorber including the inner tube 11, the outer tube 12, the piston 15, the piston rod 21, the metering pin 26, the rebound spring 30, the first and second passage area adjustment mechanisms 33 and 34, the extension-side and compression-side damping force generation mechanisms 35 and 36, and the like as illustrated in FIG. 2, as one example of the stroke-sensitive damper 6. However, the present invention is not limited thereto, and may use not only the twin tube-type shock absorber but also a single tube-type shock absorber (damper) on the front wheel side, and may use any arbitrary stroke-sensitive shock absorber as long as this shock absorber can acquire a damping force characteristic like the characteristic lines 49 and 50 illustrated in FIG. 4. However, especially, the use of the stroke-sensitive damper according to the present embodiment allows the compression-side damping force to be set to the soft characteristic in the range where the piston rod enters the cylinder beyond the minimum length-side predetermined position to reduce the roll stiffness, and to be set to the hard characteristic when the stroke is switched to the extension stroke after that, thereby improving the performance of controlling the vibration in the return direction.

The present exemplary embodiment has been described assuming that the mechanical damping force variable shock absorber is embodied by the stroke-sensitive shock absorber configured to change the damping force according to the stroke by way of example. However, the present invention may use, for example, a frequency-sensitive damper configured to mechanically change the damping force.

Next, inventions included in the above-described embodiment will be described. The above-described embodiment has been described assuming that the shock absorber configured to mechanically change the damping force is embodied by the stroke-sensitive shock absorber configured to change the damping force according to the stroke. The stroke-sensitive shock absorber is configured to set the roll stiffness of the vehicle body to a low value on the front wheel side, and the damping force adjustable shock absorber is configured no variably set the roll stiffness of the vehicle body on the rear wheel side by the electronic control. In this manner, setting the roll stiffness on the front wheel side to a low value and setting the roll stiffness on the rear wheel side to a high value can establish the so-called diagonal roll, and improve the responsiveness to the yaw when the driver steers the vehicle.

Further, the above-described damping force adjustable shock absorber is configured to variably adjust the damping force on the rear wheel side by the actuator in such a manner that, as the roll angle of the vehicle body increases, the pitch angle toward the front side of the vehicle increases to orient the vehicle body into the nosedive-like posture, and the above-described stroke-sensitive shock absorber is configured to permit the vehicle body to be oriented in the nosedive-like posture on the front wheel side at this time. This configuration allows the inexpensive stroke-sensitive shock absorber to be used on the front side, thereby increasing the pitch angle in response to the roll movement to succeed in realizing the diagonal behavior. Further, this configuration can improve the responsiveness to the steering operation compared to the vehicle according to the conventional technique, due to the use of the damping force adjustable shock absorber capable of controlling or configured to control the roll stiffness to the appropriate degree by the electronic control on the rear wheel side. In addition, this configuration can improve the workability at the time of the manufacturing and the assembling.

Further, according to the present embodiment, the stroke-sensitive shock absorber as the above-described mechanical damping force variable shock absorber includes the cylinder sealingly containing the hydraulic fluid, the piston slidably fittedly inserted in the cylinder and dividing the inside of the cylinder into the two chambers, the piston rod coupled with the piston and extending out of the cylinder, the communication passage configured to establish communication between the two chambers in such a manner that the movement of the piston causes the flow of the hydraulic fluid between the two chambers, and the damping force generation apparatus disposed in the communication passage and configured to generate the damping force by suppressing the flow of the hydraulic fluid that is caused by the movement of the piston. The damping force generation apparatus includes the passage area adjustment mechanism configured to adjust the passage area of the communication passage according to the stroke position of the piston rod so as to have at least any one of the maximum length-side characteristic, according to which the extension-side damping force is set into the soft state and the compression-side damping force is set into the hard state in the range where the piston rod extends out of the cylinder beyond a maximum length-side predetermined position, and the minimum length-side characteristic where the extension-side damping force is set into the hard state and the compression-side damping force is set into the soft state in the range where the piston rod enters the cylinder beyond a minimum length-side predetermined position. This configuration can provide, for example, an effect that allows the shock absorber to set the damping at the time of the roll return to a high value although reducing the stiffness in the roll input direction in response to the steering input to result in the large roll.

(1) A suspension system, which is used together with a vehicle including a vehicle body, a front wheel, and a rear wheel, includes a mechanical damping force variable shock absorber disposed between the vehicle body and the front wheel and configured, to mechanically change a damping force, and a damping force adjustable shock absorber disposed between the vehicle body and the rear wheel and configured to adjust a damping force by an actuator.

(2) In the suspension system according to the item (1), the mechanical damping force variable shock absorber is a stroke-sensitive shock absorber configured to change the damping force according to a stroke. The stroke-sensitive shock absorber is configured to set a stiffness of the vehicle body in a roll direction to a low value on a front wheel side, and the damping force adjustable shock absorber variably sets the stiffness of the vehicle body on a rear wheel side by electronic control.

(3) In the suspension system according to the item (1) or (2), the damping force adjustable shock absorber is configured to variably adjust the damping force on the rear wheel side by the actuator in such a manner that, as a roll angle of the vehicle body increases, a pitch angle toward a front side of the vehicle increases to orient the vehicle body into a nosedive-like posture. The mechanical damping force variable shock absorber is configured to permit the vehicle body to be oriented into the nosedive-like posture on the front wheel side at this time.

(4) In the suspension system according to any of the items (1) to (3), the mechanical damping force variable shock absorber includes a cylinder sealingly containing hydraulic fluid, a piston slidably fittedly inserted in the cylinder and dividing an inside of the cylinder into two chambers, a piston rod coupled with the piston and extending out of the cylinder, a communication passage configured to establish communication between the two chambers in such a manner that a movement of the piston causes a flow of the hydraulic fluid between the two chambers, and a damping force generation apparatus disposed in the communication passage and configured to generate the damping force by suppressing the flow of the hydraulic fluid that is caused by the movement of the piston. The damping force generation apparatus includes a passage area adjustment mechanism configured to adjust a passage area of the communication passage according to a stroke position of the piston rod so as to have at least any one of a maximum length-side characteristic, according to which an extension-side damping force is set into a sort state and a compression-side damping force is set into a hard state in a range where the piston rod extends out of the cylinder beyond a maximum length-side predetermined position, and a minimum length-side characteristic where the extension-side damping force is set into the hard state and the compression-side damping force is set into the soft state in a range where the piston rod enters the cylinder beyond a minimum length-side predetermined position.

(5) In the suspension system according to the item (4), the damping force generation apparatus includes a hydraulic pilot-type damping valve having a pilot chamber. The passage area adjustment mechanism controls a hydraulic pressure in the pilot chamber by adjusting a passage area of the communication passage.

(6) A shock absorber-equipped vehicle includes a vehicle body self-propelled by being provided with a front wheel and a rear wheel, and the suspension, system according to any of the items (1) to (5). As one example, the vehicle includes two front wheels and two rear wheels. The mechanical damping force variable shock absorber is disposed between each of the front wheels and the vehicle body. The damping force adjustable shock absorber, which can adjust the damping force by the actuator, is disposed on each of the rear wheels and the vehicle body.

According to the above-described embodiment, both the performance of the suspension system, and the workability at the time of the manufacturing and the assembling can be improved by combining the mechanical damping force variable shock absorber configured to mechanically change the damping force, and the damping force adjustable shock absorber. More specifically, the vehicle can utilize the advantages of the mechanical damping force variable shock absorber and the damping force adjustable shock absorber, thereby improving the performance of the suspension system (for example, the steering operability, the maneuvering stability, and the ride comfort while the vehicle is running), and also improving the workability at the time of the manufacturing and the assembling.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

Although the embodiments of the present invention have been described above based on some examples, the described embodiments are for the purpose of facilitating the understanding of the present invention and are not intended to limit the present invention. The present invention may be modified and improved without departing from the spirit thereof, and the invention includes equivalents thereof. In addition, the elements described in the claims and the specification can be arbitrarily combined or omitted within a range in which the above-mentioned problems are at least partially solved, or within a range in which at least a part of the advantages is achieved.

This application claims priority under the Paris Convention to Japanese Patent Application No. 2014-156843 filed on Jul. 31, 2014.

The entire disclosure of Japanese Patent Application No. 2014-156843 filed on Jul. 31, 2014 including specification, claims, drawings and summary is incorporated herein by reference in its entirety.

The entire disclosure of International Publication No. 2013/081004 and Japanese Patent Application Publication No. 2009-281584 including specification, claims, drawings and summary is incorporated herein by reference in its entirety.

REFERENCE SIGNS LIST

1: vehicle body
2: front wheel
3: rear wheel
4, 7: suspension apparatus
5, 8: spring
6: stroke-sensitive damper (stroke-sensitive shock absorber, mechanical damping force variable shock absorber)
9: damping force control damper (damping force adjustable shock absorber)
9A: actuator
11: inner tube (cylinder)
12: outer cube
15: piston
15A, 15B: oil passage (communication passage)
16: rod-side chamber
17: bottom-side chamber
21: piston rod.
25: rod internal passage (communication passage)
26: metering pin
30: rebound spring
33: first passage area adjustment mechanism (damping force generation apparatus)
34: second passage area adjustment mechanism (damping force generation apparatus)
35: extension-side damping force generation mechanism (damping force generation apparatus)
36: compression-side damping force generation apparatus (damping force generation apparatus)
51: controller (control apparatus)
52: sprung acceleration sensor
53: steering angle sensor

What is claimed is:

1. A shock absorber-equipped vehicle comprising:
a vehicle body self-propelled and provided with a front wheel and a rear wheel;
a mechanical damping force variable shock absorber disposed between the vehicle body and the front wheel, and configured to mechanically and autonomously change a damping force without use of an actuator; and
a damping force adjustable shock absorber disposed between the vehicle body and the rear wheel, and configured to adjust a damping force according to a control signal from a controller by an actuator when the vehicle is steered,
wherein the damping force adjustable shock absorber variably sets a stiffness of the vehicle body in a roll direction on a rear wheel side by electronic control,
wherein the damping force adjustable shock absorber is configured to, by having a characteristic in which an extension-side damping force is set into a soft state and a compression-side damping force is set into a hard state, variably adjust the damping force on the rear wheel side by the actuator in such a manner that, as a roll angle of the vehicle body increases, a pitch angle toward a front side of the vehicle increases to orient the vehicle body into a nosedive-like posture, and
wherein the mechanical damping force variable shock absorber is configured to, by having a characteristic in which an extension-side damping force is set into a hard state and a compression-side damping force is set into a soft state, permit the vehicle body to be oriented into the nosedive-like posture on the front wheel side.

2. The shock absorber-equipped vehicle according to claim 1, wherein the mechanical damping force variable shock absorber includes
a cylinder sealingly containing hydraulic fluid,
a piston slidably fittedly inserted in the cylinder, and dividing an inside of the cylinder into two chambers,
a piston rod coupled with the piston and extending out of the cylinder,
a communication passage configured to establish communication between the two chambers in such a manner that a movement of the piston causes a flow of the hydraulic fluid between the two chambers, and
a damping force generation apparatus disposed in the communication passage, and configured to generate the damping force by suppressing the flow of the hydraulic fluid that is caused by the movement of the piston, and
wherein the damping force generation apparatus includes a passage area adjustment mechanism configured to adjust a passage area of the communication passage according to a stroke position of the piston rod so as to have at least any one of a maximum length-side characteristic, according to which an extension-side damping force is set into a soft state and a compression-side damping force is set into a hard state in a range where the piston rod extends out of the cylinder beyond a maximum length-side predetermined position, and a minimum length-side characteristic where the extension-side damping force is set into the hard state and the compression-side damping force is set into the soft state in a range where the piston rod enters the cylinder beyond a minimum length-side predetermined position.

3. The shock absorber-equipped vehicle according to claim 2, wherein the damping force generation apparatus includes a hydraulic pilot-type damping valve having a pilot chamber, and wherein the passage area adjustment mechanism controls a hydraulic pressure in the pilot chamber by adjusting a passage area of the communication passage.

4. The shock absorber-equipped vehicle according to claim 1, wherein the vehicle includes two front wheels and two rear wheels with the mechanical damping force variable shock absorber disposed between each of the front wheels and the vehicle body, and the damping force adjustable shock absorber disposed on each of the rear wheels and the vehicle body.

5. A shock absorber-equipped vehicle comprising:
a vehicle body self-propelled and provided with a front wheel and a rear wheel;
a mechanical damping force variable shock absorber disposed between the vehicle body and the front wheel, and configured to mechanically and autonomously change a damping force without use of an actuator; and
a damping force adjustable shock absorber disposed between the vehicle body and the rear wheel, and configured to adjust a damping force according to a control signal from a controller by an actuator when the vehicle is steered,
wherein the damping force adjustable shock absorber is configured to, by having a characteristic in which an extension-side damping force is set into a soft state and a compression-side damping force is set into a hard state, variably adjust the damping force on a rear wheel side by the actuator in such a manner that, as a roll angle of the vehicle body increases, a pitch angle toward a front side of the vehicle increases to orient the vehicle body into a nosedive-like posture, and
wherein the mechanical damping force variable shock absorber is configured to, by having a characteristic in which an extension-side damping force is set into a hard state and a compression-side damping force is set into a soft state, permit the vehicle body to be oriented into the nosedive-like posture on a front wheel side.

6. The shock absorber-equipped vehicle according to claim 5, wherein the mechanical damping force variable shock absorber includes
a cylinder sealingly containing hydraulic fluid,
a piston slidably fittedly inserted in the cylinder, and dividing an inside of the cylinder into two chambers,
a piston rod coupled with the piston and extending out of the cylinder,
a communication passage configured to establish communication between the two chambers in such a manner that a movement of the piston causes a flow of the hydraulic fluid between the two chambers, and
a damping force generation apparatus disposed in the communication passage and configured to generate the damping force by suppressing the flow of the hydraulic fluid that is caused by the movement of the piston, and
wherein the damping force generation apparatus includes
a passage area adjustment mechanism configured to adjust a passage area of the communication passage according to a stroke position of the piston rod so as to have at least any one of a maximum length-side characteristic, according to which an extension-side damping force is set into a soft state and a compression-side damping force is set into a hard state in a range where the piston rod extends out of the cylinder beyond a maximum length-side predetermined position, and a minimum length-side characteristic where the extension-side damping force is set into the hard state and the compression-side damping force is set into the soft state in a range where the piston rod enters the cylinder beyond a minimum length-side predetermined position.

7. A suspension system for vehicle including a vehicle body, a front wheel, and a rear wheel, the suspension system comprising:
a mechanical damping force variable shock absorber disposed between the vehicle body and the front wheel, and configured to mechanically and autonomously change a damping force without use of an actuator; and
a damping force adjustable shock absorber disposed between the vehicle body and the rear wheel, and configured to adjust a damping force according to a control signal from a controller by an actuator when the vehicle is steered,
wherein the damping force adjustable shock absorber variably sets a stiffness of the vehicle body in a roll direction on a rear wheel side by electronic control, and
wherein the damping force adjustable shock absorber is configured to, by having a characteristic in which an extension-side damping force is set into a soft state and a compression-side damping force is set into a hard state, variably adjust the damping force on a rear wheel side by the actuator in such a manner that, as a roll angle of the vehicle body increases, a pitch angle toward a front side of the vehicle increases to orient the vehicle body into a nosedive-like posture, and
wherein the mechanical damping force variable shock absorber is configured to, by having a characteristic in which an extension-side damping force is set into a hard state and a compression-side damping force is set into a soft state, permit the vehicle body to be oriented into the nosedive-like posture on a front wheel side.

8. The suspension system according to claim 7, wherein the mechanical damping force variable shock absorber includes
a cylinder sealingly containing hydraulic fluid,
a piston slidably fittedly inserted in the cylinder, and dividing an inside of the cylinder into two chambers,
a piston rod coupled with the piston and extending out of the cylinder,
a communication passage configured to establish communication between the two chambers in such a manner that a movement of the piston causes a flow of the hydraulic fluid between the two chambers, and
a damping force generation apparatus disposed in the communication passage and configured to generate the damping force by suppressing the flow of the hydraulic fluid that is caused by the movement of the piston, and
wherein the damping force generation apparatus includes
a passage area adjustment mechanism configured to adjust a passage area of the communication passage according to a stroke position of the piston rod so as to have at least any one of a maximum length-side characteristic, according to which an extension-side damping force is set into a soft state and a compression-side damping force is set into a hard state in a range where the piston rod extends out of the cylinder beyond a maximum length-side predetermined position, and a minimum length-side characteristic where the extension-side damping force is set into the hard state and the compression-side damping force is set into the soft state in a range where the piston rod enters the cylinder beyond a minimum length-side predetermined position.

9. The suspension system according to claim 8, wherein the damping force generation apparatus includes a hydraulic pilot-type damping valve having a pilot chamber, and wherein the passage area adjustment mechanism controls a hydraulic pressure in the pilot chamber by adjusting a passage area of the communication passage.

10. A shock absorber-equipped vehicle comprising:
a vehicle body self-propelled and provided with a front wheel and a rear wheel;
a mechanical damping force variable shock absorber disposed between the vehicle body and the front wheel, and configured to mechanically and autonomously change a damping force without use of an actuator, the mechanical damping force variable shock absorber including a cylinder and a piston rod configured to be axially moved from a maximum length to a minimum length; and
a damping force adjustable shock absorber disposed between the vehicle body and the rear wheel, and configured to adjust a damping force by an actuator, wherein the mechanical damping force variable shock absorber has a characteristic in which a compression-side damping force is changed to a soft characteristic when a position of the piston rod relative to the cylinder is in a range where the piston rod enters the cylinder beyond a minimum length-side predetermined position, and is then changed to a hard characteristic when a stroke is switched to the extension stroke.

11. The shock absorber-equipped vehicle according to claim 10, wherein the damping force adjustable shock absorber is configured to adjust a damping force according to an instruction from a controller, and wherein the controller is configured to set a roll stiffness by the damping force adjustable shock absorber to a higher value such that a pitch angle toward a front side of the vehicle increases to orient the vehicle body into a nosedive-like posture as a roll angle of the vehicle body increases.

12. The shock absorber-equipped vehicle according to claim 10, wherein the mechanical damping force variable shock absorber is a stroke sensitive shock absorber configured to change the damping force according to the stroke.

* * * * *